Nov. 5, 1940.  E. H. WELLECH  2,220,433

GLASS WOOL APPARATUS

Filed Dec. 30, 1937

INVENTOR.
EDMUND H. WELLECH
BY Dorsey, Cole & Garner
ATTORNEYS.

Patented Nov. 5, 1940

2,220,433

UNITED STATES PATENT OFFICE 2,220,433

GLASS WOOL APPARATUS

Edmund H. Wellech, Corning, N. Y., assignor, by mesne assignments, to Owens-Corning Fiberglas Corporation, a corporation of Delaware Application December 30, 1937, Serial No. 182,577

6 Claims. (Cl. 49—55)

This invention relates to the production of fine filaments of glass and more particularly to a furnace structure in which the glass is melted and from which it is drawn into filaments.

The object of this invention is a furnace structure in which glass may be quickly and economically melted and refined.

A further object of the invention is a furnace structure which is capable of adjustment to control the quality and quantity of glass flowing therefrom.

A still further object of the invention is a device for dividing a body of glass into a plurality of separate streams which may be attenuated into filaments.

The invention features a melting furnace of semicylindrical form mounted on trunnions for movement about its longitudinal axis and having a refractory metal lip disposed along one edge which terminates in a notched flange along its outer edge thru which individual bodies flow for attenuation into filaments.

Figure 1:
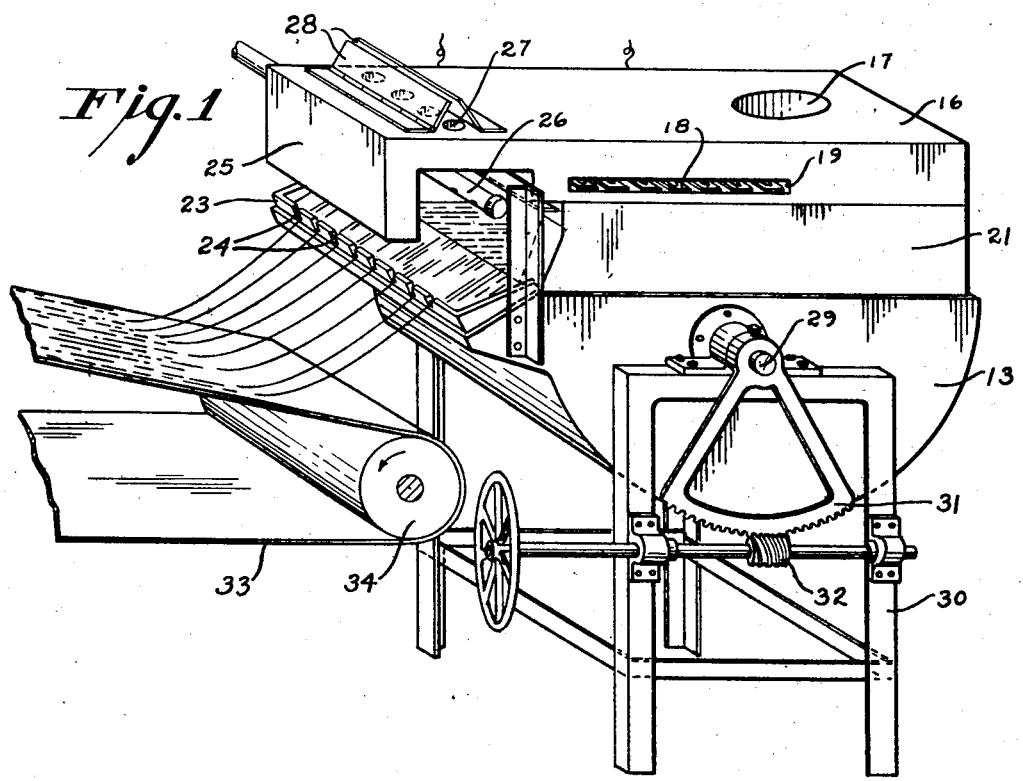
Figure 2:
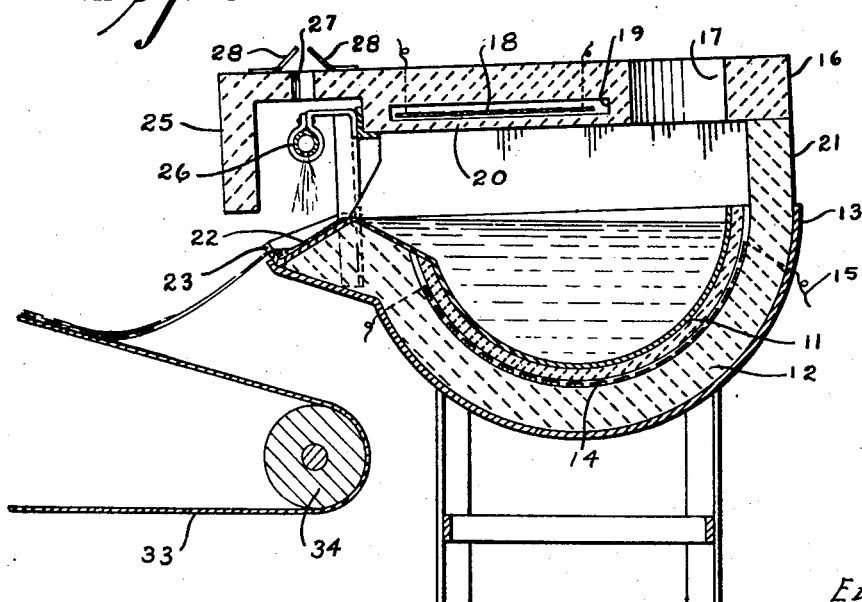

Further features of the invention will be readily apparent from a study of the accompanying specification and drawing in which:

Fig. 1 is an elevation in perspective showing the furnace from its working side; and Fig. 2 is an elevation on a transverse section thru Fig. 1.

As shown in the above drawing, the apparatus consists of a semicylindrical melting receptacle 11 formed of refractory material and encased in refractory insulating material 12 and supported in a shell 13. An electrical resistance heating unit 14 is positioned between the receptacle and the insulating material and is connected with a suitable source of current by means of lead wires 15. A refractory cover 16 is positioned above the melting receptacle and has therein a charging opening 17 communicating with the interior of the receptacle. Electrical resistance elements 18 are positioned in a cavity 19 in the cover in such manner that they heat the surface 20 immediately above the receptacle to a uniform temperature thruout its area.

Walls 21 around three sides of container 11 substantially prevent egress of heat or molten material from the furnace. Along the remaining side of the receptacle is disposed a refractory metal flow plate 22. This plate may be formed of any of the high temperature corrosion resistant metals such as the iron-nickel-chromium alloys, platinum and the platinum group alloys. This plate may be merely a continuation of the furnace lining 11 or, if this is a ceramic material the plate may be provided with a flange which overlies the edge of the melting receptacle and extends partially into the same, thereby providing a corrosion resisting lip for the receptacle over which molten glass may flow. An upwardly extending flange 23 is formed along the outer edge of the flow plate 22 and is provided with a plurality of flow openings which in the present embodiment of the invention take the form of small notches 24.

A depending section 25 of the cover 16 overhangs the flow plate 22 to aid in controlling the temperature thereof. Heating means 26 are positioned beneath the cover 16 between the depending section 25 and the body of the furnace and openings 27 are provided in the upper surface of the cover 16 and are equipped with dampers 28. Adjustment of these dampers controls the draft over the flow plate thereby modifying the effect of heater 26 thereon and regulating the temperature of the flowing sheet of glass.

The entire assembly of furnace and cover is supported by the shell 13 which is mounted on trunnions 29 supported by framework 30. These trunnions are located along the axis of the semicylindrical furnace about which the assembly may be moved under the influence of sector 31 and worm 32.

Beneath and in front of the flow plate 22 is positioned a fibre drawing mechanism consisting of an endless conveyor belt 33 passing around rollers 34 which are driven from a suitably regulable source of power such as a variable speed motor, not shown.

In operation glass is introduced into the furnace thru the charging opening 17 and attains proper viscosity under the influence of heating elements 14 and 18. When a suitable amount of molten glass is accumulated in the furnace, it is rotated about its axis by worm 32 and sector 31 until a small volume of glass overflows the lip of the furnace and flows down as a thin sheet on flow plate 22. When the molten glass reaches the flange 23 its progress is checked until it builds up a body of glass sufficiently deep to flow thru notches 24. As the glass flows thru these openings a globule is first formed which soon pulls away from the flange and attenuates under the influence of gravity until it contacts the conveyor 33. The globule or slug is caught thereon and the fine body of glass connecting it to the furnace is drawn out by the movement of the conveyor into a fine filament. This filament tends to stick to the conveyor and a skein of filaments is built up thereon which may be removed continuously or intermittently in any desired manner.

This apparatus has been found extremely flexible in operation. By adjustment of cover dampers 28 and heater 26, any desired viscosity of the glass on the flow plate can be maintained regardless of the composition thereof. Rate of delivery of the glass to the flow plate is easily controlled thru rotation of the furnace and control of the temperature conditions on the flow plate. These adjustments taken in conjunction with control of speed of the conveyor 33 permit almost any diameter of fibre to be produced at will.

While a preferred form of the invention has been described in detail, modification and substitution are to be permitted within the scope of the appended claims.

I claim:

1. In combination a refractory container for molten glass, rectangular in cross section, of substantial wall thickness and open at the top, means for heating the container, a refractory sheet metal lining for the container having a portion covering the top face of one vertical wall of the container and terminating in an upstanding flange along the outer edge of such top wall, said flange having fluid outlet channels therethrough at spaced intervals throughout its length.

2. In combination a refractory container for molten glass, rectangular in cross section and open at the top, means for heating said container, a refractory metal flow plate positioned along one top edge of said container and extending over the edge thereof into the interior of the container, said flow plate having an upturned flange along its outer edge, said flange being provided at spaced intervals with flow openings, and means for moving said container and flow plate about an axis parallel with said edge of said flow plate.

3. In combination a refractory container for molten glass, rectangular in cross section and open at the top, means for heating said container, a refractory metal flow plate positioned along one top edge of said container and extending over such edge into the interior of said container, said flow plate having an upturned flange along its outer edge, said flange being provided at spaced intervals with flow openings, a refractory cover above said flow plate, and heating means beneath said cover.

4. In combination a refractory container for molten glass, rectangular in cross section and open at the top, means for heating said container, a refractory metal flow plate positioned along one top edge of said container and extending over the edge thereof into the interior of said container, said flow plate having an upturned flange along its outer edge, said flange being provided at spaced intervals with flow openings, heating means above said flow plate, a refractory cover extending over said flow plate and heating means, said cover including a regulable opening located above said heating means.

5. In combination a refractory container for molten glass, rectangular in cross section and open at its top, means for heating the container, a refractory metal flow plate positioned along one top edge of the container and extending over said edge into the interior of the container, said flow plate having an upstanding flange along its outer edge, said flange being provided at spaced intervals with flow openings and means separate from said container heating means for controlling the heat conditions along said flow plate.

6. In combination a refractory container for molten glass, rectangular in cross section and open at the top, means for heating the container, a refractory metal flow plate positioned along one top edge of the container and extending thereover into the interior of the container, said flow plate having an upstanding flange along its outer edge, said flange being provided at spaced intervals with flow openings, means separate from said container heating means for controlling the heat conditions along said flow plate and means for varying the inclination of said flow plate to cooperate with said last named means in controlling the rate of flow of glass on said flow plate.

EDMUND H. WELLECH.